Oct. 7, 1969
H. LIEBE ET AL  3,471,676
WELDING TORCH FOR THE ELECTRIC ARC WELDING UNDER PROTECTIVE GAS
Filed April 28, 1967
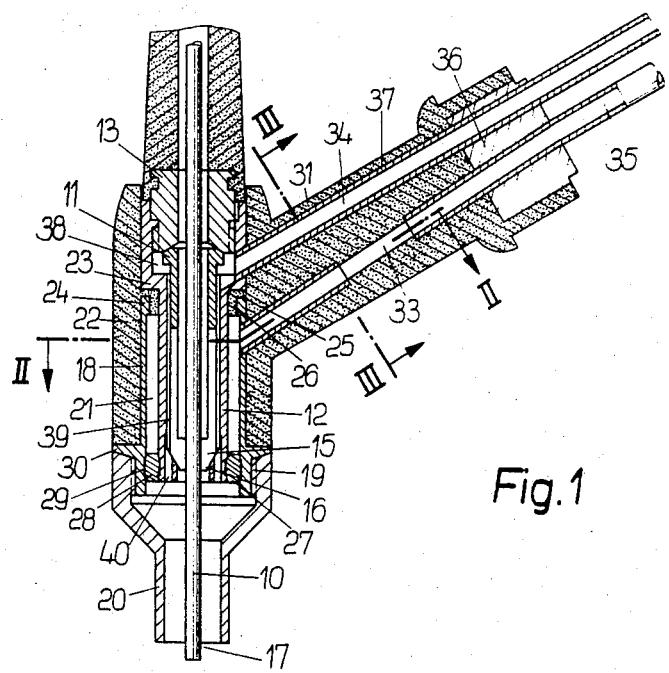
Fig.1
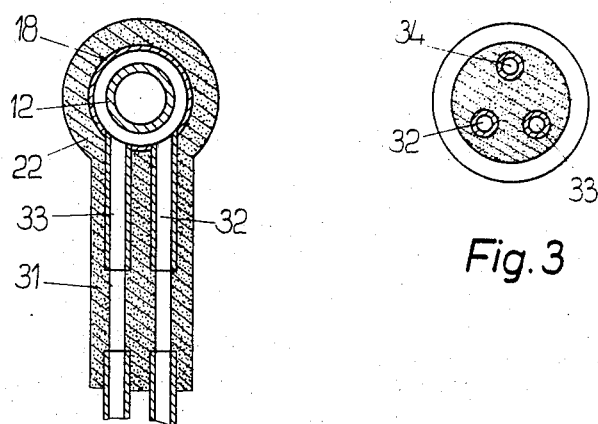
Fig.2
Fig.3

United States Patent Office 3,471,676
Patented Oct. 7, 1969

3,471,676
WELDING TORCH FOR THE ELECTRIC ARC WELDING UNDER PROTECTIVE GAS
Holm Liebe, Frankfurt am Main-Neid, Johann Heider, Unterliderbach-Frankfurt am Main, and August Hatzfeld, Frankfurt am Main, Germany, assignors to Messer Griesheim G.m.b.H., Frankfurt am Main, Germany, a corporation of Germany
Filed Apr. 28, 1967, Ser. No. 634,643
Claims priority, application Germany, Apr. 30, 1966, M 69,345
Int. Cl. B23k 9/16, 9/24, 35/38
U.S. Cl. 219—75      13 Claims

ABSTRACT OF THE DISCLOSURE

A welding torch for the electric arc welding under protective gas, wherein the electrode as well as the protective gas nozzle, are cooled by a common ring-shaped water-circulating chamber, arranged concentrically with the electrode, and which is limited within by an adapter sleeve housing surrounding the electrode adapter sleeve and outside by a ring-shaped member which serves for the attachment of the protective gas nozzle.

Background of the invention

In a known welding torch of the above-named type, the adapter sleeve housing in its revertive range turned away from the torch aperture is surrounded by a relatively massive metal member guiding the welding stream. From this metal member the welding stream reaches the adapter sleeve housing and from there it reaches the electrode. The above metal member further serves for the attachment of the tube-shaped member, which in its front area faces the torch orifice and together with the surface of the adapter sleeve housing forms the initially named ring-shaped coolant-circulating chamber. In order to avoid a current leakage from the metal member to the tube-shaped member and therefore to the protective gas nozzle, there is arranged between the metal member and the tube-like member an insulating intermediate piece. This insulating intermediate piece is sleeve-shaped and is screwed to the metal member. Then the tube-shaped member is screwed to the sleeve-shaped intermediate piece. The sealing of the coolant circulating chamber at its frontal sides takes place in that elastic O-rings, of which one is arranged between a collar at both the adapter sleeve housing and at the tube-shaped member and the other is arranged between a collar both at the intermediate member and at the tube-shaped member. In order to achieve a satisfactory gasket function of the O-rings, they must be prestressed by tightening either the intermediate member or the tube-shaped member.

The essential disadvantages of the above-described known welding torch reside, on the one hand in their complicated and expensive construction, where for example the processing of the tube-shaped member having an inner and outer thread and intermediate member is very bulky. Furthermore, an improper tightening of these two parts can easily lead to a cutting off of the sealing O-rings and thus to the uselessness of the torch. In addition, the concentric arrangement of the metal member of the intermediate piece and of the tube-shaped member requires—aside from a considerable weight requirement—a large space allowance, whereby an already, in itself, expendable protective gas torch becomes unwieldly and no longer can be used without restriction.

Brief summary of invention

The object of this invention is to eliminate the above disadvantages and to provide a welding torch of the initially described type which is uncomplicated, is less costly in its construction, and is handy and not susceptible to disturbances during operation. For the solution of this problem it is essentially proposed according to the invention, that the adapter sleeve housing and the tube-shaped member are fixed together by a casing of synthetic material surrounding the torch, and are insulated from each other with the welding stream being supplied directly to the adapter sleeve housing.

The preceding inventive thought advantageously enables, on the one hand, a release of the metal member and of the insulating intermediate piece, and on the other hand a comparatively simple assembly of the tube-shaped member which for example need still have only one threading which serves for the attachment of the metal protective gas nozzle. The embedding of the adapter sleeve housing and of the tube-shaped member in the plastic casing suitably takes place in such a manner that the respective parts are pressed around by the plastic casing whereby the latter can envelop the entire torch in a closed form and thus—at the same time—suitably represent a protective casing against damages to the torch from the outside. Furthermore, such a construction of the torch makes possible an advantageous avoidance of steplike transitions at the outer outlines, as they are disadvantageously shown by the known above-described torch, which accordingly extensively avoids the danger of a jamming and a catching of the torch, together with a damage to the respective parts.

For the attachment of the adapter sleeve housing in the plastic casing it is proposed that the essentially cylindrical adapter sleeve housing in its range turned away from the torch aperture has a projection with a contact surface with which it is arranged in a corresponding recess in the plastic casing. The tube-shaped member is attached in a ring-shaped recess in the plastic casing by its range or zone turned away from the torch aperture. This range is suitably constructed as a projection, whereby the plastic casing can surround this projection and therefore affords a good attachment of the tube-shaped member. This part of the plastic casing, which extends as a collar between the tube-shaped member and the adapter sleeve housing, further serves advantageously for the sealing of the coolant-circulating chamber in reverse direction and for the insulation of the stream conducting adapter sleeve housing from the tube-shaped member.

For a further advantageous construction of the invention, it is next proposed that adhesive and sealing means be provided between the contact surfaces of the plastic casing and of the tube-shaped member as well as of the adapter sleeve housing.

Thereby the sealing and fixing function of the plastic casing is further strengthened. In this case a projection-like construction of the tube-shaped member is generally not required.

The frontal sealing of the coolant-circulating chamber is inventively done in such a manner that the coolant-circulating chamber is closed off at its frontal side turned to the torch aperture by a ring made of an elastic, electro-insulating material, for instance rubber, which is arranged between the adapter sleeve housing and the tube-shaped member.

The ring is then suitably brought under prestress, whereby its inner and outer surface can engage in an annular groove of comparatively small depth in the adapter sleeve housing or in the tube-shaped member. The ring can thus also serve advantageously for the fixing of the tube-shaped member opposite the adapter sleeve housing, where a cutting off of the ring is not to be feared, since the cohesion setting in becomes comparatively slight.

With reference to the construction of the tube-shaped member, which is desirable per se over the above-described inventive characteristics and can be fitted to the existing structural conditions, it is further proposed according to the invention that the tube-shaped member in its range turned to the torch aperture has a collar which serves as a stop for the metal protective gas nozzle and as the limiting surface for the plastic casing.

The part of the tube-shaped member arranged with respect to the collar laterally to the torch aperture suitably has the threading which serves for the attachment of the metal protective gas nozzle.

A suitable outer form of the torch without stepwise transition is rendered when the metal protective gas nozzle, collar and plastic casing snugly seal at the circumference. This is furthermore advantageous in that this extensively prevents an eventual jamming and sticking of the torch.

Of course the plastic casing surrounding the torch can continue laterally as the torch handle, in which case it suitably contains the canals for the supply and discharge of the coolant as well as the canal for the supply of protective gas. With reference to the coolant and protective gas supply it is proposed that both of the coolant canals with the tube-shaped member and the protective gas canal with the adapter sleeve housing be connected. The coolant thus advantageously reaches directly the chamber between the tube-shaped member and the adapter sleeve housing, while the protective gas is conducted in a known manner to the protective gas nozzle through the ring slot between the adapter sleeve and the adapter sleeve housing.

The supply of welding stream to the torch handle takes place in a known manner through a cable which at the same time serves for the discharge of coolant from the torch. A good cooling of the cable, heated by the relatively strong welding current, is to be achieved. The invention further proposes that the cable conducting the welding current end in a metal bridge imbedded in the torch handle which is connected with the protective gas canal and serves for transfer of the welding current to the same.

For the purpose of conduction of the welding current, a metallic lining is recommended for the protective gas canal, in which case this tube-shaped metallic lining suitably leads directly into the adapter sleeve housing and directly conducts to it the welding current. From there it can reach the electrode by way of the adapter sleeve without touching the tube-shaped member connected with the metallic protective gas nozzle.

The canal serving for supply of the protective gas and welding current basically can lead into the adapter sleeve housing at any desired spot. However, it is preferred that the canal serving for supply of the protective gas and welding current leads into the adapter sleeve housing at about the level of the start of its widening.

This widened part of the adapter sleeve housing—on the basis of its relatively roomy construction being suitable for this—is provided within with a circular canal into which the protective gas reaches from the canal. The circular canal can be terminated at the rear by a screw which is arranged in a threading in the adapter sleeve housing, is engaged with the adapter sleeve, and serves for the holding of the electrode in the adapter sleeve.

The drawings

FIG. 1 shows a welding torch in accordance with this invention in cross-section;

FIG. 2 shows a cross-section in the direction of line II—II of FIG. 1; and

FIG. 3 shows a cross-section in the direction of line III—III of FIG. 1.

Detailed description

As seen in the drawing, a non-consumable electrode 10 is clamped in an adapter sleeve 11. The adapter sleeve 11 is arranged in an adapter sleeve housing 12 and is engaged with a screw 13 screwed into the same, whereby it is pressed by screw 13 into a corresponding conical recess 16 in the adapter sleeve housing 12 with its conical point 15 provided with elongated slots, not visible in the drawing, and thereby locks itself at this point around electrode 10.

The adapter sleeve housing 12 in its frontal range turned toward the torch orifice 17 is surrounded concentrically by a metal tube-shaped member 18 which has a threading 19 and there serves for the attachment of a metal protective gas nozzle 20. Adapter sleeve 12 and tube-shaped member 18 form a ring-shaped chamber 21 through which coolant is conducted, the coolant serving for cooling the adapter sleeve housing 12 and the adapter sleeve 11 on the one hand and the metal protective gas nozzle 20—indirectly over the tube-shaped member 18—on the other hand.

For the attachment of the adapter sleeve housing 12 and of the tube-shaped member 18, there is provided a plastic casing 22 surrounding the torch. The adapter sleeve housing 12 has widening 23 for this purpose and is arranged in a corresponding recess in the plastic casing 22. The tube-shaped member 18 with its back projection-like end 24 is imbedded in a ring-shaped recess 25 in the plastic casing 22. A good stabilization of parts 12 and 18 is achieved by the fact that the plastic casing 22 presses around them.

In addition to securing of both members 12 and 18, the plastic casing 22 at the same time serves for their electrical insulation. The tube-shaped part 18 must be insulated from the conducting adapter sleeve housing 12 connected with the current conducting electrode 10 by way of the adapter sleeve 11 in order to avoid a transfer of the electric arc from the metal protective gas nozzle 20 to the work piece and thus to avoid damage to it.

Furthermore, plastic casing 22, with its member 26 extending collar-like between tube-shaped member 18 and adapter sleeve housing 12, serves for the sealing of the coolant-circulating chamber 21, at its rear. The sealing of the coolant-chamber 21 at its front surface turned toward the torch aperture 17 is accomplished by means of an elastic, electro-insulating ring 27 made of rubber or the like. This sealing ring 27 is preferably inserted under prestress between the adapter sleeve housing 12 and the ring-shaped member 18, whereby it locks radially both inside as well as outside in circular grooves 28 or 29 at a relatively small depth in member 12 or 18. The sealing ring 27 here can contribute for the securing of both parts 12 and 18.

The plastic casing 22, which extends in the direction of the torch aperture up to a collar 30 at the tube-shaped member 12, continues laterally into the torch handle 31. The torch handle 31 contains canals in passages 32, 33 for supply and discharge of coolant as well as a canal 34 which serves for the supply of protective gas. The coolant canals 32, 33 terminate in the tube-shaped member 12 and thus directly in chamber 21 (see particularly FIGURE 2). Canal 33 serving for discharge of coolant, well visible in FIGURE 1, terminates at the end of the torch handle in a cable terminal 35, which at the same time serves for the supply of the welding current. This conducting cable terminal 35 is secured in a metal bridge 36 in the torch handle 31 and terminates in the insulating plastic layer forming the torch handle. The metal bridge 36 conducts the welding current to the protective gas canal 34 from where the welding current reaches the adapter sleeve housing 12 and thus by way of adapter sleeve 11 the electrode 10. For the purpose of the circuit, canal 34 terminating at the level of the widening 23 into adapter sleeve housing 12 is provided with a metal lining 37.

The protective gas reaches from canal 34 an annulus 38 in the adapter sleeve housing 12 and from there the interior space of the metal protective gas nozzle 20 surrounding the electrode 10 by way of a ring slot 39 between adapter sleeve housing 12 and adapter sleeve 11 and through concentric borings 40 in the adapter sleeve housing 12.

The embodiment of the invention described above and illustrated in the drawing serves only for the purpose of illustration of the invention, which of course is not limited to this example. The invention can also be utilized for example on a torch wth consumable wire electrode, where a contact tube of known construction can take the place of adapter sleeve 11.

What is claimed is:

1. A welding torch for electric arc welding utilizing a protective gas comprising a torch head including an adapter sleeve, an electrode in said adapter sleeve, a housing concentrically arranged around said adapter sleeve with a protective gas chamber being formed therebetween, a protective gas passageway communicating with said gas chamber, a protective gas nozzle end communicating with said gas chamber downstream from said gas passageway, a tubular member being disposed around said housing with a coolant chamber being formed therebetween, coolant passage means communicating with said coolant chamber, said adapter sleeve housing and said tubular member being secured together by a concentric casing made of a synthetic material which insulates said housing from said tubular member, means supplying the welding current to said electrode through said housing, and said housing, having a projection disposed remote from said nozzle end which is engaged in a corresponding recess in said casing to secure said housing to said casing.

2. A torch as set forth in claim 1 wherein said tubular member is secured to said casing in an annular recess in said casing remote from said nozzle end.

3. A torch as set forth in claim 2 wherein said tubular member includes a projection secured to said angular recess extending away from said nozzle end.

4. A welding torch for electric arc welding utilizing a protective gas comprising a torch head including an adapter sleeve, an electrode in said adapter sleeve, a housing concentrically arranged around said adapter sleeve with a protective gas chamber being formed therebetween, a protective gas passageway communicating with said gas chamber, a protective gas nozzle end communicating with said gas chamber downstream from said gas passageway, a tubular member being disposed around said housing with a coolant chamber being formed therebetween, coolant passage means communicating with said coolant chamber, said adapter sleeve housing and said tubular member being secured together by a concentric casing made of a synthetic material which insulates said housing from said tubular member, means supplying the welding current to said electrode through said housing, and said coolant chamber is closed off at its end adjacent to the nozzle end by a ring made of an elastic, electro-insulating material disposed between said housing and said member.

5. A welding torch for electric arc welding utilizing a protective gas comprising a torch head including an adapter sleeve, an electrode in said adapter sleeve, a housing concentrically arranged around said adapter sleeve with a protective gas chamber being formed therebetween, a protective gas passageway communicating with said gas chamber, a protective gas nozzle end communicating with said gas chamber downstream from said gas passageway, a tubular member being disposed around said housing with a coolant chamber being formed therebetween, coolant passage means communicating with said coolant chamber, said adapter sleeve housing and said tubular member being secured together by a concentric casing made of a synthetic material which insulates said housing from said tubular member, means supplying the welding current to said electrode through said housing, said tubular member having a collar adjacent said nozzle end, said collar acting as stop means for said nozzle end and as limit means for said casing.

6. A welding torch for electric arc welding utilizing a protective gas comprising a torch head including an adapter sleeve, an electrode in said adapter sleeve, a housing concentrically arranged around said adapted sleeve with a protective gas chamber being formed therebetween, a protective gas passageway communicating with said gas chamber, a protective gas nozzle end communicating with said gas chamber downstream from said gas passageway, a tubular member being disposed around said housing with a coolant chamber being formed therebetween, coolant passage means communicating with said coolant chamber, said adapter sleeve housing and said tubular member being secured together by a concentric casing made of a synthetic material which insulates said housing from said tubular member, means supplying the welding current to said electrode through said housing, said casing including an offset portion constituting handle means, said coolant passage means being passages in said handle means for the supply and discharge of coolant, said current supply means including a conductive portion of said coolant discharge passage, a metal bridge being connected to said conductive portion of said discharge passage in said handle means, and said gas passageway being conductively connected to said bridge.

7. A torch as set forth in claim 6 wherein said housing includes a stop member engaged in a recess in said casing, said gas passageway terminating at substantially the same height as said stop member.

8. A welding torch for electric arc welding utilizing a protective gas comprising a torch head including an adapter sleeve, an electrode in said adapter sleeve projecting from said nozzle, a housing concentrically arranged around said adapter sleeve with a protective gas chamber being formed therebetween, a protective gas passageway communicating with said gas chamber, a protective gas nozzle communicating with said gas chamber downstream from said gas passageway, a tubular member being disposed around said housing with a coolant chamber being formed therebetween, coolant supply and discharge passage means communicating with said coolant chamber, a handle connected to said nozzle, said protective gas passageway and said coolant passage means being mounted in said handle, means for supplying the welding current to said electrode, said current supply means including a portion of said coolant passage means remote from said torch head being electrically conductive, an electrically conductive bridge connecting said electrically conductive portion of said coolant passage means to said gas passageway, and said gas passageway being electrically conductive and in electrically conductive communication with said electrode.

9. A torch as set forth in claim 8 wherein said handle is made of an insulating material and includes borings for receiving said gas passageway and said coolant passage means, said passage means being first tubes extending from said torch head into said borings in said handle communicating with second tubes in said borings spaced from said first tubes.

10. A torch as set forth in claim 8 wherein said adapter sleeve housing and said tubular member are secured together by a casing made of a synthetic material which insulates said housing from said tubular member.

11. A torch as set forth in claim 10 wherein said tubular member includes a projection imbedded in said casing to secure said tubular member to said casing.

12. A torch as set forth in claim 10 wherein said coolant chamber is closed by an elastic electrically insulated ring between said adapter sleeve housing and said tubular member.

13. A torch as set forth in claim 10 wherein said tubular member includes a collar which comprises stop means for said protective gas nozzle and limit means for said casing.

References Cited

UNITED STATES PATENTS 3,030,490   4/1962   Reed _____ 219—75

JOSEPH V. TRUHE, Primary Examiner

C. L. ALBRITTON, Assistant Examiner